(12) United States Patent
Sakugawa et al.

(10) Patent No.: US 8,655,579 B2
(45) Date of Patent: Feb. 18, 2014

(54) DRIVING ASSISTANCE DEVICE

(75) Inventors: Jun Sakugawa, Gotenba (JP); Hideo Fukamachi, Hadano (JP); Masayuki Shimizu, Susono (JP); Shinichi Nagata, Yokohama (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/519,650

(22) PCT Filed: Mar. 16, 2010

(86) PCT No.: PCT/JP2010/054433
§ 371 (c)(1),
(2), (4) Date: Jun. 28, 2012

(87) PCT Pub. No.: WO2011/114442
PCT Pub. Date: Sep. 22, 2011

(65) Prior Publication Data
US 2012/0330541 A1      Dec. 27, 2012

(51) Int. Cl.
*G06F 17/10* (2006.01)
(52) U.S. Cl.
USPC .......................................... 701/301; 340/435
(58) Field of Classification Search
USPC ................... 701/300, 301; 340/435, 438
See application file for complete search history.

(56) References Cited

U.S. PATENT DOCUMENTS

| | | | |
|---|---|---|---|
| 7,864,032 B2 * | 1/2011 | Kogure et al. | 340/435 |
| 7,966,127 B2 * | 6/2011 | Ono et al. | 701/300 |
| 8,090,537 B2 * | 1/2012 | Nishira et al. | 701/301 |
| 8,538,902 B2 * | 9/2013 | Taguchi | 706/46 |
| 2008/0097699 A1 | 4/2008 | Ono | |
| 2008/0189040 A1 * | 8/2008 | Nasu et al. | 701/301 |
| 2009/0143987 A1 * | 6/2009 | Bect et al. | 701/301 |

FOREIGN PATENT DOCUMENTS

| | | |
|---|---|---|
| JP | A-2002-260192 | 9/2002 |
| JP | A-2004-106673 | 4/2004 |
| JP | A-2008-243065 | 10/2008 |
| JP | A-2009-23560 | 2/2009 |
| WO | WO 2006/070865 A1 | 7/2006 |

OTHER PUBLICATIONS

Apr. 13, 2010 International Search Report issued in International Patent Application No. PCT/JP2010/054433.

* cited by examiner

*Primary Examiner* — Thomas Black
*Assistant Examiner* — Shardul Patel
(74) *Attorney, Agent, or Firm* — Oliff PLC (57) ABSTRACT

A device for providing driving assistance for a driver of the vehicle to avoid the object of the risk subject when driving the vehicle, which includes: an object determination unit that detects the object; a collision prediction time calculation unit that calculates a time to collision which is a time indicating a degree to which the vehicle approaches to the object; an estimated risk level determination unit that determines an estimated risk level indicating a possibility of the object moving onto a predicted travelling path of the vehicle; and a driving assistance content determination unit that determines driving assistance content based on the collision prediction time and the estimated risk level.

3 Claims, 8 Drawing Sheets

| FIXED/ESTIMATED COLLISION PREDICTION TIME (sec) | | ESTIMATED RISK LEVEL | | | |
|---|---|---|---|---|---|
| | | R0 | R1 | R2 | R3 |
| T1 | 2.5~3.5 | NO ASSISTANCE (ONLY SENSOR TRACKING) | NO ASSISTANCE | REMINDER | ALARM |
| T2 | 1.8~2.5 | NO ASSISTANCE (ONLY SENSOR TRACKING) | REMINDER | AVOIDANCE INDUCTION | ALARM + AVOIDANCE INDUCTION |
| T3 | ~1.8 | PROVISION OF INFORMATION OR ONLY SENSOR TRACKING | REMINDER | AVOIDANCE CONTROL | ALARM + AVOIDANCE CONTROL |

DRIVING ASSISTANCE DEVICE

TECHNICAL FIELD

This invention relates to a driving assistance device.

BACKGROUND ART

In the related art, a device that calculates a potential risk based on a collision prediction time (Time To Collision: TTC) which is a physical quantity indicating the degree to which the current host vehicle approaches to a preceding vehicle, and performs a driving assistance such as a braking control and a steering control in response to a calculated potential risk has been well known (referring to Patent Literature 1, for example).

CITATION LIST

Patent Literature

[Patent Literature 1] Japanese Unexamined Patent Application Publication No. 2004-106673

SUMMARY OF INVENTION

Technical Problem

The TTC is used to determine control contents in the device of the prior art and is calculated based on relative speed between the host vehicle and an object to be determined, and current positions of the host vehicle and the object, and is obtained on the consumption that the host vehicle and the object maintain the same moving state as the current state. Accordingly, the TTC in the prior art can represent a risk manifested in the current state. Meanwhile, for example, in a case where the object is not present on the predicted travelling path of the host vehicle, since it is not assumed that the host vehicle collides with the object, the ITC is not defined. However, in a case where the object enters moving state different from the current state, a risk that the host vehicle collides with the object occurs. That is, even in a case where an object is not present on the predicted travelling path of the host vehicle, there is a case where there is a potential risk. With the device of the prior art, driving assistance based on such potential risk cannot be performed.

Accordingly, the present invention is made to resolve the problem mentioned above and an object thereof is to provide a driving assistance device that is able to perform the driving assistance considering the potential risk.

Solution to Problem

The driving assistance device according to an aspect of the present invention is a driving assistance device which provides driving assistance for the driver of the vehicle to avoid the object of risk subject when driving the vehicle, the device including: object detection means for detecting the object; collision prediction time calculation means for calculating the collision prediction time which is a time indicating a degree to which the vehicle approaches to the object; estimated risk level determination means for determining an estimated risk level indicating a possibility of the object moving onto a predicted travelling path of the vehicle; and driving assistance content determination means for determining driving assistance content based on the and the estimated risk level.

In the driving assistance device of the present invention, when the driving assistance content is determined, based on the collision prediction time, there is consideration of the estimated risk level which indicates the possibility of the object moving onto the predicted travelling path of the vehicle. Thereby, even in a case where a risk is manifested, that is, a case where the object is not present on the predicted travelling path of the vehicle, the potential risk related to the object is considered in determining the driving assistance content. Accordingly, it is possible to provide the driving assistance considering the potential risk.

Further the collision prediction time calculation means calculates a fixed collision prediction time which is the collision prediction time with respect to the object which presents on the predicted travelling path of the vehicle in a case where the object presents on the predicted travelling path of the vehicle, and in a case where the object presents at a location other than the predicted travelling path of the vehicle, calculates an estimated collision prediction time which is the collision prediction time with the object in a case where it is assumed that the object presenting at a location other than the predicted travelling path of the vehicle has moved on the predicted travelling path.

According to this configuration, in a case where the object presents on the predicted travelling path of the vehicle, the fixed collision prediction time is calculated regarding the risk as being manifested. Meanwhile, in a case where the object presents at a location other than the predicted travelling path of the vehicle, on the assumption that the object has moved onto the predicted travelling path of the vehicle regarding that there is the potential risk, the estimated collision prediction time is calculated based on a location after movement of the object. Thereby, even in either a case where the risk is being manifested or a case where the risk is not being manifested, the collision prediction time is calculated properly.

Further, the driving assistance device of the present invention further includes a traffic environment information acquisition means for acquiring the traffic environment information which is information related to the traffic environment in the vicinity of the vehicle and the object, wherein an estimated risk level determination means may determine the estimated risk level as higher in a case when acquiring the traffic environment information indicating a possibility of the object moving onto the predicted travelling path of the vehicle, compared with a case when acquiring the traffic environment information.

In a case where there is the traffic environment in which the object may move onto the predicted travelling path of the vehicle, it is considered that the possibility of the object moving onto the predicted travelling path of the vehicle is high. According to this configuration, since the estimated risk level of a case where there is the traffic environment in which the object may move onto the predicted travelling path of the vehicle is determined as higher compared with a case where such environment is not present, it is possible to provide a driving assistance appropriately considering the potential risk. Further, as the traffic environment information, there is exemplified information related to a traffic law, a road shape and presence of certain structures on the road.

Furthermore, in the driving assistance device of the present invention, the estimated risk level determination means determines the estimated risk level as higher in a case when acquiring information indicating the movement of the object onto the predicted travelling path of the vehicle, compared with a case when not acquiring the information.

The case where the object moves onto the predicted travelling path of the vehicle can be regarded as a state where the collision risk related to the object has been manifested. According to this configuration, in such case, since it is determined that the estimated risk level is higher, it is possible to provide the driving assistance appropriately considering the risk related to the object.

Further, in the driving assistance device of the present invention, the estimated risk level determination means determines the estimated risk level on the basis of cause-and-effect relationship information which is information based on the relationship between an object and another object relating to at least one of attributes, position and speed, as information indicating the cause-and-effect relationship between an object and the other object different from the object.

The movement of the object is affected from the other object different from the object. For example, depending on the presence of the other object, there is a case of high possibility of the object moving onto the predicted travelling path of the vehicle. According to this configuration, since the estimated risk level related to the object is determined based on the cause-and-effect relationship between the object and the other object, it is possible to improve the determination accuracy of the estimated risk level as well as to provide appropriate driving assistance.

Advantageous Effects of Invention

According to the driving assistance device of the present invention, it is possible to perform the driving assistance considering the potential risk.

DESCRIPTION OF EMBODIMENTS

Hereinafter, a preferred embodiment of the present invention with reference to the attached drawings will be described in detail. Further, in the following description, the same or the corresponding subject is denoted by the same reference numeral or symbol, and the description for the corresponding portion is omitted.

Figure 1:
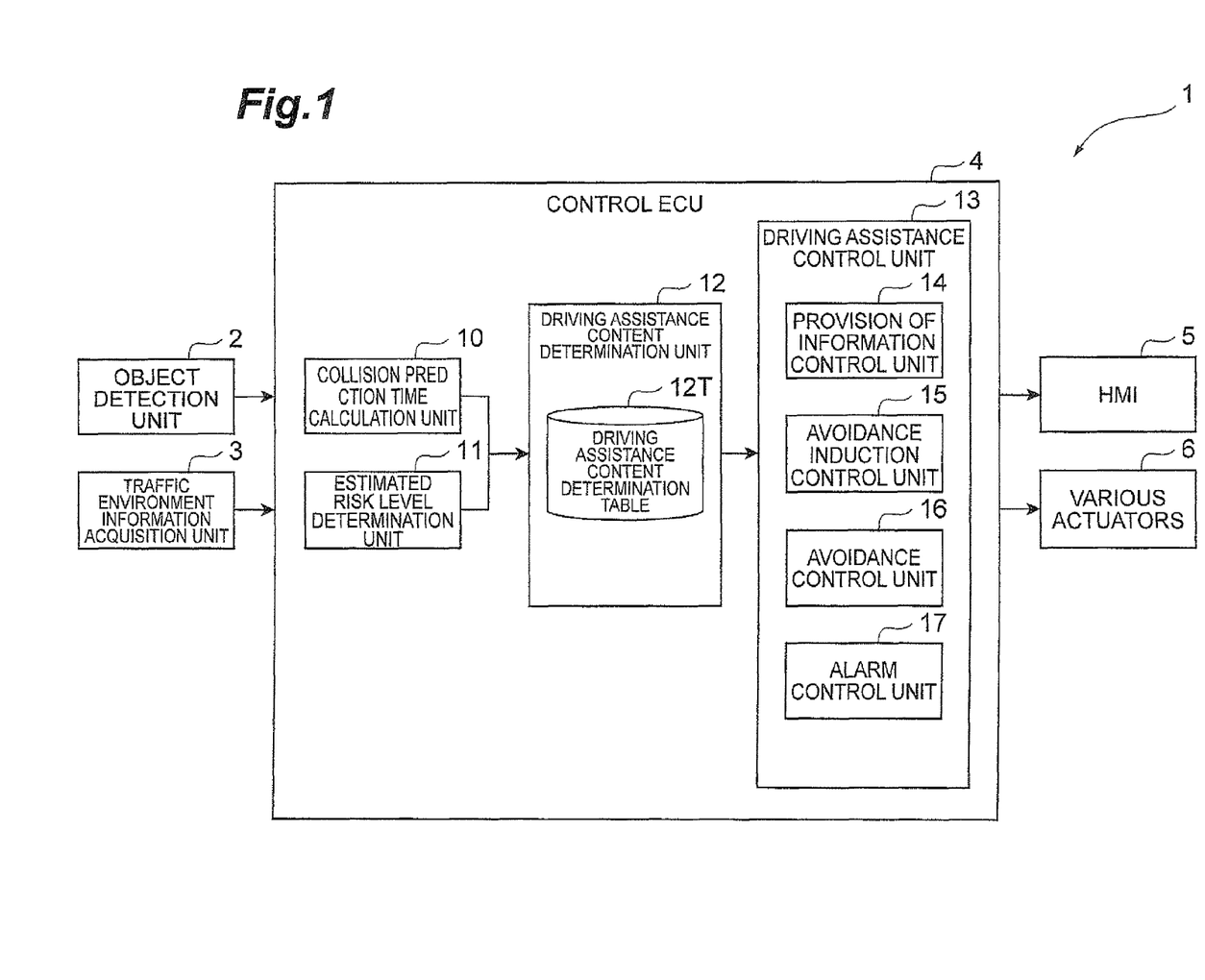
[FIG. 1] is a configuration diagram of a driving assistance device related to an embodiment of the present invention.

FIG. 1 is a configuration diagram of an embodiment of the driving assistance device of the present invention. The driving assistance device 1 is a device for providing driving assistance for the driver of a vehicle to enable avoiding the object of the risk subject when driving the vehicle.

The driving assistance device 1 as illustrated in FIG. 1 includes an object detection unit 2 (object detection means), a traffic environment information acquisition unit 3 (traffic information acquisition means), a control ECU (Electronic Control Unit) 4, a HMI (Human Machine Interface) 5, and various actuators 6.

The object detection unit 2 is a portion for detecting an object of the risk subject when driving the vehicle and can detect presence or absence, position and speed of the object. The object of the risk subject includes a pedestrian, a vehicle, other obstacles and the like which present on the predicted travelling path of the vehicle and around the predicted travelling path thereof. In addition, the predicted travelling path is the travelling path of the vehicle in a case where the vehicle maintains the current travelling state.

The object detection unit 2 is constituted by a camera and image recognition process means, for example. The image recognition process means is constituted by a computer. Further, the object detection unit 2 may be constituted by a radar device. The object detection unit 2 sends the object information of position, size or the like with regard to the detected object to the control ECU 4. The object detected by the object detection unit 2 includes, for example, pedestrians, stopped vehicles, vehicles in the opposite lane, obstacles on the road and the like. That is, the object detected in the object detection unit 2 includes not only the object having the direct risk subjects when driving the vehicle, but also the object having a possibility of exerting an influence on the movement of the risk object.

The traffic environment information acquisition unit 3 is a portion for obtaining the traffic environment information which is information related to the traffic environment in the vicinity of the vehicle and object. The traffic environment information acquisition unit 3 is constituted by, for example, a camera, a radar device, an infrastructure information communication device and the like. The infrastructure information communication device is a device for receiving the traffic environment information of a road from the infrastructure during the host vehicle is travelling, and may be constituted as a part of the functions of a so-called ear-navigation device or may be constituted as a single communication device.

The traffic environment information acquisition unit 3 acquires information related to traffic law, road shape, presence of certain structures on the road and the like, as the traffic environment information. More specifically, the traffic environment information includes information which is related to all possible traffic environments in the vicinity of the vehicle, predicted travelling path of the vehicle and objects detected by the object detection unit 2, and for example, includes the presence of crosswalks, sign on the road warn of the presence of a crosswalk, and the presence of guardrails. Further, certain structures which are detected as traffic environment information include shops and the like which are located on both sides of the road. The traffic environment information acquisition unit 3 sends out the acquired traffic environment information to the control ECU 4. In addition, the driving assistance device 1 of the embodiment includes the traffic environment information acquisition unit 3, but the traffic environment information acquisition unit 3 may not be included in its minimum configuration.

The control ECU 4 is a device for performing the driving assistance to avoid the object which is the risk subject by controlling a HMI 5 and various actuators 6, based on the information acquired from the object detection unit 2 and the traffic environment information acquisition unit 3, and is constituted by a computer including a storage device such as CPU, ROM or RAM, an input-output interface and the like.

The ECU 4 includes a collision prediction time calculation unit 10 (collision prediction time calculation means), an estimated risk level determination unit 11 (estimated risk level determination means), a driving assistance content determination unit 12 (driving assistance content determination means) and a driving assistance control unit 13.

Figure 2:
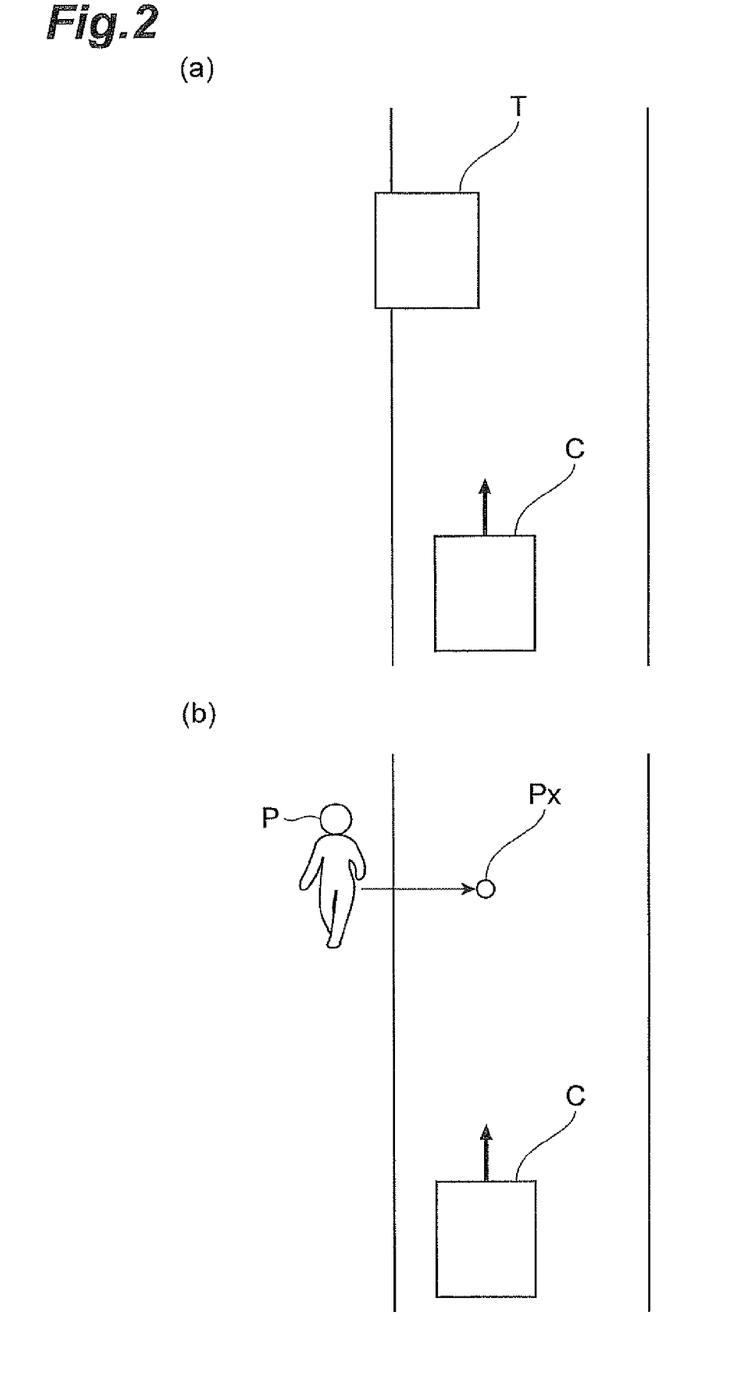
[FIG. 2] is a diagram illustrating a positional relationship between a vehicle and a parked vehicle of an object, and is a diagram illustrating the positional relationship between a vehicle and a pedestrian of the object.

The collision prediction time calculation unit 10 is a portion for calculating the time to collision which is a time indicating a degree to which the vehicle approaches to the object. The collision prediction time is calculated by dividing the distance from the vehicle to the object by the relative speeds of a host vehicle and an object. The collision prediction time calculation unit 10 calculates a fixed collision prediction time in a case where an object presents on the predicted travelling path of the vehicle, and calculates an estimated collision prediction time in a case where the object presents at a location other than the predicted travelling path of the vehicle. The fixed collision prediction time is a fixed time to collision with an object which presents on the predicted travelling path of the vehicle. Further, the estimated collision prediction time is a time to collision with the object in a case where it is assumed that the object presenting at a location other than the predicted travelling path of the vehicle has moved onto the predicted travelling path. The collision prediction time calculation unit 10 sends out the calculated collision prediction time to the driving assistance content determination unit 12. Referring to FIG. 2, the fixed collision prediction time and the estimated collision prediction time will be described in detail.

FIG. 2(*a*) is a diagram illustrating a positional relationship between a vehicle C and a parked vehicle T of the object. As shown in FIG. 2(*a*), the parked vehicle T presents on the predicted travelling path of the vehicle C. In this case, since the parked vehicle T is a risk subject manifested with respect to the vehicle C, the collision prediction time calculation unit 10 calculates a fixed collision prediction time by dividing the distance from the vehicle C to the parked vehicle T by the relative speeds of the vehicle C and the parked vehicle T.

FIG. 2(*b*) is a diagram illustrating a positional relationship between a vehicle C and a pedestrian P that is the object. As shown in FIG. 2(*b*), since the pedestrian P being on the sidewalk presents at a location other than the predicted travelling path of the vehicle, even if the vehicle C travels in this state, the vehicle C will not collide with the pedestrian P. However, in a case where the pedestrian P has moved onto the travelling range of the vehicle C, there is a possibility of the vehicle colliding with the pedestrian P. Thus, the pedestrian P is a potential risk subject in driving the vehicle C. In this case, the collision prediction time calculation unit 10 calculates the estimated collision prediction time by dividing the distance from the vehicle C to a position Px of the pedestrian P, assuming that the pedestrian P moves onto the predicted travelling path of the vehicle C, by the relative speeds of the vehicle C and the pedestrian P.

As described referring to FIGS. 2(*a*) and 2(*b*), in a case where an object presents on the predicted travelling path of the vehicle, the fixed collision prediction time is calculated as if the risk were manifested, and in a case where an object presents at a location other than the predicted travelling path of the vehicle, on the assumption that the object has moved onto the predicted travelling path of the vehicle as if the potential risk presented, the estimated collision prediction time is calculated based on a location after movement of the object. Accordingly, even in either of a case where the risk is being manifested or a case where the risk is not being manifested, the collision prediction time may be appropriately calculated.

The estimated risk level determination unit 11 is a portion for determining the estimated risk level indicating a possibility of the object which is not present on the predicted travelling path of the vehicle c moving onto the predicted travelling path of the vehicle. In other words, the estimated risk level indicates a risk level related to the object of the potential risk subject. The estimated risk level determination unit 11 sends out the estimated risk level as determined above to the driving assistance content determination unit 12.

More specifically, the estimated risk level determination unit 11 determines the estimated risk level as higher in a case when acquiring the traffic environment information indicating that the object may move onto the predicted travelling path of the vehicle, compared with a case when not acquiring the traffic environment information. Further, the estimated risk level determination unit 11 determines the estimated risk level as higher in a case when acquiring information indicating movement of the object onto the predicted travelling path of the vehicle C, compared with a case when not acquiring the information. Furthermore, the estimated risk level determination unit 11 determines the estimated risk level on the basis of cause-and-effect relationship information which is information based on a relationship between an object and another object relating to at least one of attribute, position and speed, as information indicating cause-and-effect relationship between the object and the other object different from the object.

Figure 3:
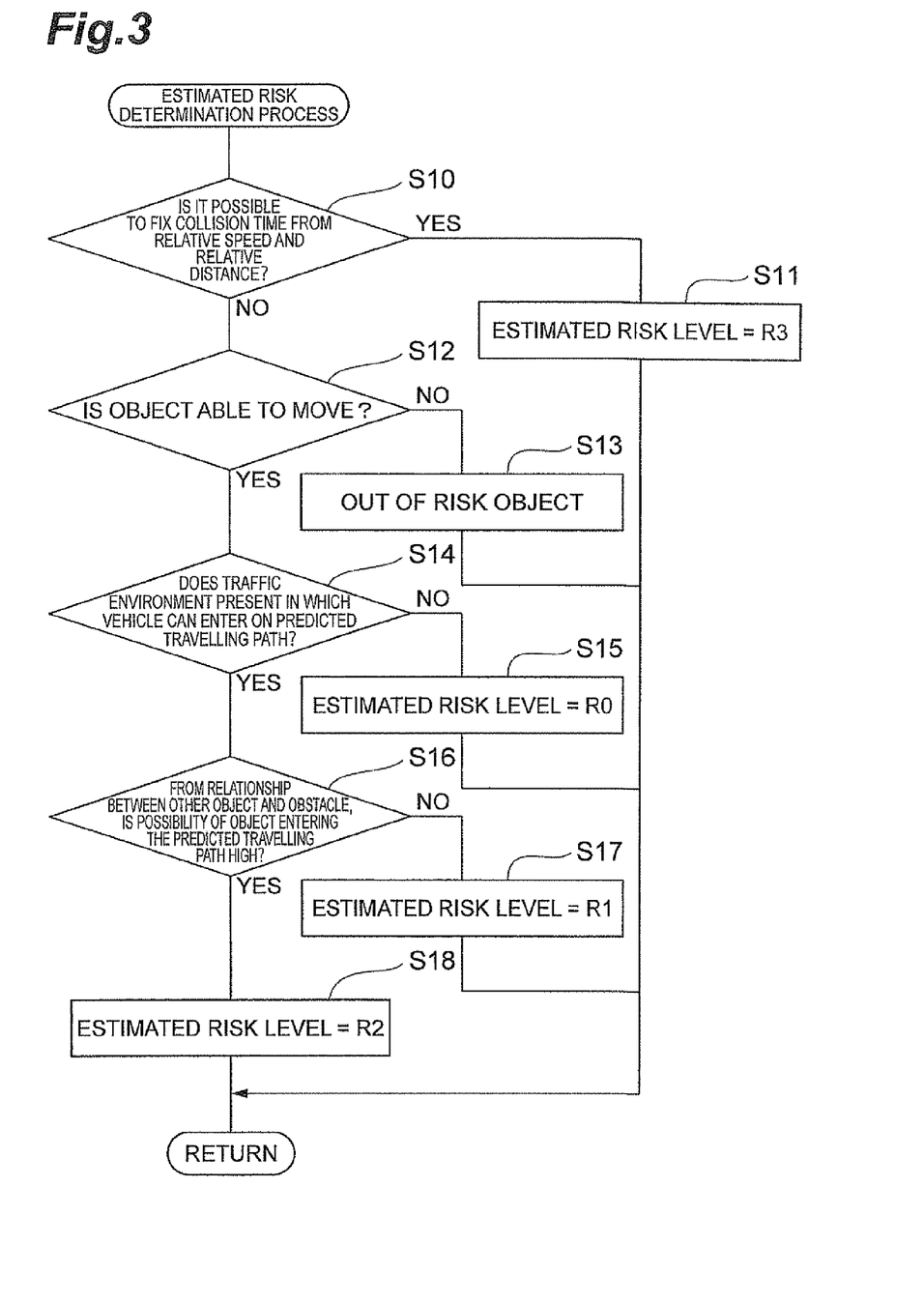
[FIG. 3] is a flowchart illustrating an estimated risk level determination process in an estimated risk level determination unit.

An estimated risk level determination process in the estimated risk level determination unit 11 will be described with reference to FIG. 3 and FIG. 4. FIG. 3 is a flowchart illustrating an estimated risk level determination process in the estimated risk level determination unit 11. Further, FIGS. 4(*a*) to 4(*d*) are diagrams illustrating examples of situations of the object and the traffic environment for each estimated risk level. In the embodiment, as an example, the estimated risk level is determined to be any of 4 steps R0 to R3. Among the 4 steps of estimated risk level, the estimated risk level R0 is the level at which the danger is the lowest and the estimated risk level R3 is the level at which the danger is the highest. Further, in the embodiment, the estimated risk level is determined in 4 steps. However, this is an example of the embodiment of the present invention and is not limited thereto.

In STEP S10, the estimated risk level determination unit 11 determines whether or not the collision prediction time can be fixed based on relative speed and relative distance between the vehicle C and the object. That is, the estimated risk level determination unit 11 determines that the collision prediction time can be fixed in a case where movement of the object onto the predicted travelling path of the vehicle C is detected. If it is determined that the collision prediction time can be fixed, the processing procedure is advanced to STEP S11. Meanwhile, if it is determined that the collision prediction time cannot be fixed, the processing procedure is advanced to STEP S12.

In STEP S11, the estimated risk level determination unit 11 determines that the estimated risk level is R3. FIG. 4(*d*) is a diagram illustrating an example of a situation of the vehicle C and the pedestrian $P_3$ in a case where it is determined that the estimated risk level is R3. As shown in FIG. 4(*d*), the pedestrian $P_3$ is not present on the predicted travelling path of the vehicle C and presents on the sidewalk, and starts to move in a direction shown by an arrow r. This case can be regarded as a state where the collision risk related to the object has been manifested. Accordingly, the estimated risk level determination unit 11 determines that the estimated risk level is R3 in a case where the movement of the pedestrian $P_3$ onto the predicted travelling path of the vehicle C is detected. That is, the estimated risk level determination unit 11 determines the estimated risk level as higher in a case when acquiring the information indicating the moving of the pedestrian $P_3$ to the predicted travelling path of the vehicle C, compared with a case when not acquiring the information. Further, in this case, the collision prediction time calculation unit 10 calculates the fixed collision prediction time for the object.

In STEP S12, the estimated risk level determination unit 11 determines whether or not the object is in movable state. In a case where the object that is not present on the predicted travelling path of the vehicle C is not a movable object, there is no possibility of the object moving onto the predicted travelling path of the vehicle C. Accordingly, in a case where it is determined that the object is not in a movable state, the processing procedure is advanced to STEP S13. In STEP S13, since there is no risk related to the object, the estimated risk level determination unit 11 determines the object as an object other than the risk object, and terminates the process for the driving assistance in order to determine the estimated risk level related to the object and to avoid the object.

Meanwhile, in a case where it is determined that the object is in movable state, the processing procedure is advanced to STEP S14. In STEP S14, the estimated risk level determination unit 11 determines whether or not there is in traffic environment that the object can enter the predicted travelling path of the vehicle C. Further, the traffic environment includes the traffic law, for example. In a case where it is not determined that a traffic environment presents where the vehicle can enter the predicted travelling path of the vehicle C, the processing procedure is advanced to STEP S15.

In STEP S15, the estimated risk level determination unit 11 determines that the estimated risk level is R0. FIG. 4(*a*) is a diagram illustrating an example of a situation of the vehicle C and the pedestrian $P_0$ in a case where it is determined that the estimated risk level is R0. As shown in FIG. 4(*a*), the pedestrian $P_0$ presents on the sidewalk outside of the predicted travelling path of the vehicle C, and thus, for example, the traffic environment, illustrated as a crosswalk for example, where the pedestrian $P_0$ can move onto the predicted travelling path of the vehicle C is not present. Further, in this case, the collision prediction time calculation unit 10 calculates the estimated time to collision with the object.

Meanwhile, in a case where it is determined that a traffic environment in which the object can enter the predicted travelling path of the vehicle C is not present, the processing procedure is advanced to STEP S16. In STEP S16, the estimated risk level determination unit 11 determines whether or not there is a high possibility of the object of the determined target entering the predicted travelling path of the vehicle C, considering the relationship between the other object different from the object of a determined target and the obstacle. In a case where it is not determined that there is high possibility of the object of the determined target entering the predicted travelling path of the vehicle, the processing procedure is advanced to STEP S17. Meanwhile, in a case where it is determined that there is high possibility of the object entering the predicted travelling path of the vehicle C, the processing procedure is advanced to STEP S18.

In STEP S17, the estimated risk level determination unit 11 determines that the estimated risk level is R1. FIG. 4(*b*) is a diagram illustrating an example of a situation of the vehicle C and pedestrian $P_1$ in a case where it is determined that the estimated risk level is R1. As shown in FIG. 4(*b*), the pedestrian $P_1$ of the object is not present on the predicted travelling path of the vehicle C, but presents on the sidewalk. Further, as the traffic environment, there presents a crosswalk $S_1$. In this case, due to the presence of the crosswalk $S_1$, the possibility that the pedestrian $P_1$ may move onto the predicted travelling path of the vehicle C is high compared with a case where there is no crosswalk $S_1$. Accordingly, the estimated risk level determination unit 11 determines the estimated risk level as high when detecting the presence of crosswalk $S_1$ which is the traffic environment information indicating that pedestrian $P_1$ may move onto the predicted travelling path of the vehicle C, compared with a case (S14, S15) when the traffic environment information is not acquired. Further, in this case, the collision prediction time calculation unit 10 calculates the estimated time to collision with the object.

Figure 4:
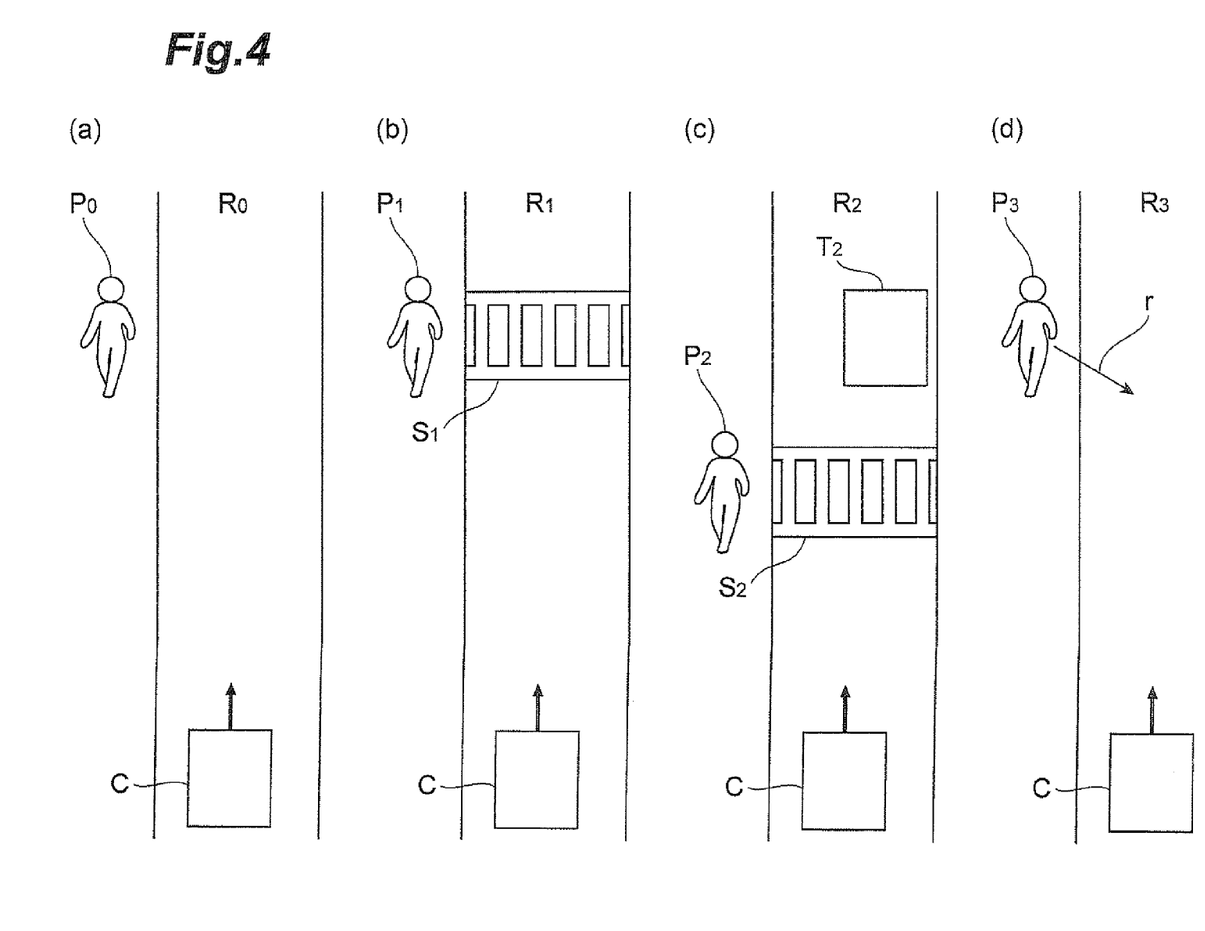
[FIG. 4] is a diagram illustrating examples of situations of the object and the traffic environment for each estimated risk level.

As described referring to FIG. 4(*b*), since the estimated risk level of a case when a traffic environment presents in which the object can move onto the predicted travelling path of the vehicle is higher than that of a case when such traffic environment is not present, it is possible to provide driving assistance appropriately considering the potential risk.

In STEP S18, the estimated risk level determination unit 11 determines that the estimated risk level is R2. FIG. 4(*c*) is a diagram illustrating an example of a situation of the vehicle C and the pedestrian $P_2$ in a case when there is determined that the estimated risk level is R2. As shown in FIG. 4(*c*), the pedestrian $P_2$ of the object is not present on the predicted travelling path, but presents on the sidewalk. Further, as such traffic environment, there presents crosswalk $S_1$ as well as a vehicle T2 stopped in the opposite lane. This situation means that if the pedestrian $P_2$ goes across the crosswalk $S_2$, since the vehicle T2 is stopped, the possibility of pedestrian $P_2$ moving onto the predicted travelling path of the vehicle C is higher comparing with a situation showing in FIG. 4(*b*). That is, based on a cause-and-effect relationship between a pedestrian $P_2$, a crosswalk $S_2$, and a vehicle T2 stopped in the opposite lane, it is possible to determine that there is high possibility of the pedestrian $P_2$ moving onto the predicted travelling path of the vehicle C.

The estimated risk level determination unit 11 can determine the estimated risk level based on the cause-and-effect relationship information indicating the cause-and-effect relationship between the pedestrian $P_2$ of the risk subject, the crosswalk $S_2$ which is the other object different from the object of the risk subject or traffic environment, and the vehicle T2 stopped in the opposite lane. The cause-and-effect relationship information is information based on the relationship relating among a risk object, another object different from the risk object, and at least one of attribute, position and speed of the traffic environment. Further, the estimated risk level determination unit 11 has a database (not shown) that a variety of cause-and-effect relationship information is stored in advance. The determination process shown in the STEP S16 is performed by determining whether or not the detected event corresponds to the stored cause-and-effect relationship information referring to the database. In a case where the object of the risk subject is a pedestrian, examples of the target of which the object has a cause-and-effect relationship include crosswalks, vehicles in the opposite lane, shops on the sidewalks, pedestrians on the sidewalk facing the sidewalk on which the object presents, and the like. As described referring to FIG. 4(*c*), since the estimated risk level is determined based on the cause-and-effect relationship between the object and another object, it is possible to improve the determination accuracy and to provide the appropriate driving assistance.

Figure 5:
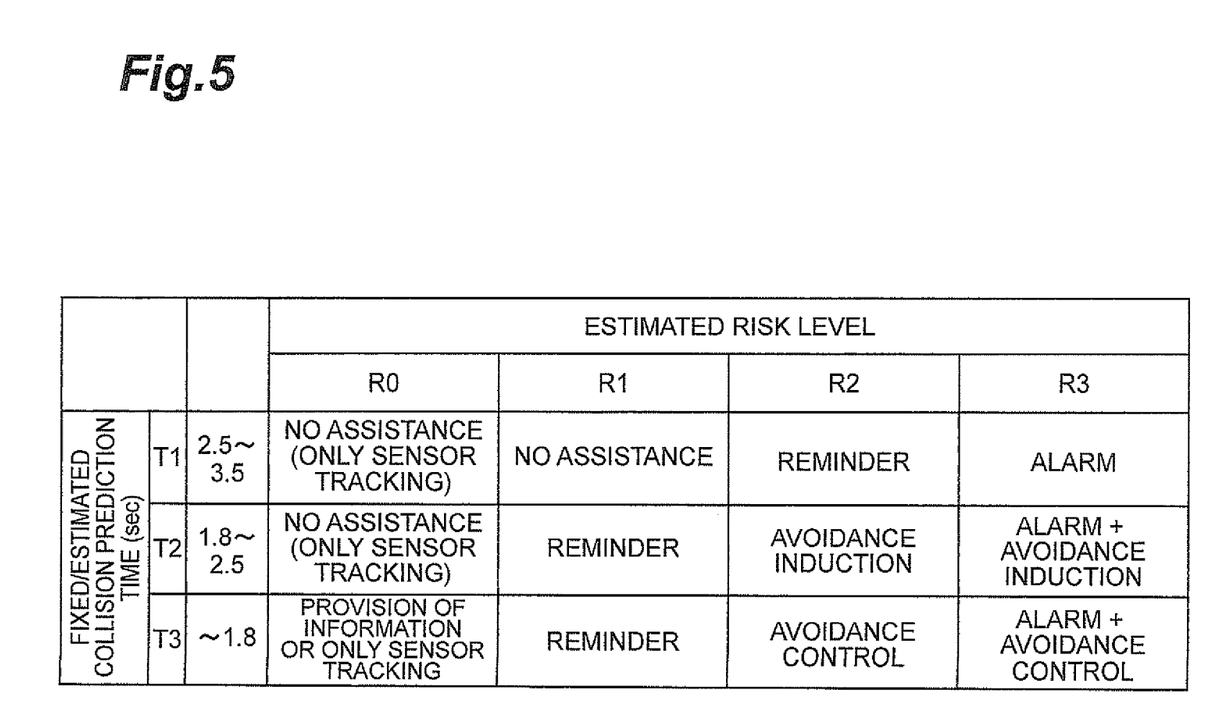
[FIG. 5] is a diagram illustrating an example of a driving assistance content determination table.

The driving assistance content determination unit 12 is a portion for determining the content for the driving assistance based on the collision prediction time and the estimated risk level. Specifically, the driving assistance content determination unit 12 determines the driving assistance content referring to the driving assistance content determination table 12T based on the collision prediction time acquired from the collision prediction time calculation unit 10 and the estimated risk level acquired from the estimated risk level determination unit 11. FIG. 5 is a diagram illustrating an example of the driving assistance content determination table 12T. The driving assistance content determination unit 12 determines the acquired collision prediction time as any of 3 steps of T1 to T3 (T1: 2.5 to 3.5 sec, T2: 1.8 to 2.5 sec, T3: 1.8 sec or less). Thus, the driving assistance content determination unit 12 extracts the driving assistance content based on collision prediction time (T1 to T3) and the estimated risk level (R0 to R3). The driving assistance content determination unit 12 sends out the information related to the extracted driving assistance content to the driving assistance control unit 13. As shown in FIG. 5, the embodiment performs driving assistance such as provision of information, reminders, a avoidance guidance, a avoidance control and an alarm generation, for example.

The driving assistance control unit 13 is a portion for performing the driving assistance by controlling the HMI 5 and the various actuators 6 based on information related to the driving assistance content acquired from the driving assistance content determination unit 12. In order to perform various driving assistance, the driving assistance control unit 13 includes information provision control unit 14, a avoidance guidance control unit 15, a avoidance control unit 16 and an alarm control unit 17. In the embodiment, the driving assistance control unit 13 performs the driving assistance such as "provision of information", "reminder", "avoidance guidance", "avoidance control" and "alarm generation", for example, in the various control units 14 to 17.

In "provision of information" for the driving assistance, in order to make so that a driver recognizes the presence of object, the object is highlighted on the display of the HMI 5. In the "reminder" for the driving assistance, the object is more strongly highlighted on the display of the HMI 5 than the case of "provision of information" even while warning sound is generated by the HMT 5.

In "avoidance guidance" for the driving assistance, the steering wheel, the brake pedal and the accelerator pedal of the vehicle are driven in a direction in which the vehicle C avoids the object. In "avoidance control" for the driving assistance, the vehicle forcibly reduces speed or changes the travelling path. In "alarm" for the driving assistance, a warning sound is output from a speaker of the HMI 5.

Further, even in a case where the driving assistance is not provided to the driver, sensor tracking may be implanted. The sensor tracking is able to capture the object continuously through various sensors (not shown) provided in the driving assistance device 1.

Further, since the driving assistance device 1 performs a process for determining the driving assistance content for each object of the risk subject, there is a case where the driving assistance content for each of a plurality of objects are simultaneously determined by the driving assistance content determination unit 12. In this case, the driving assistance control unit 13 performs an adjustment of a plurality of the driving assistance content items. The driving assistance control unit 13 is able to adjust the order of priority such that for example, event that a distance by the object is approaching or value of the collision prediction time is becoming short is prioritized among a plurality of driving assistance contents. Further, the driving assistance control unit 13 may perform all of the plurality of driving assistance contents even though a case where information related to the plurality of driving assistance contents is acquired from the driving assistance content determination unit 12. Next, the information provision control unit 14, the avoidance guidance control unit 15, the avoidance control unit 16 and the alarm control unit 17 will be described together with the various driving assistance contents.

Figure 6:
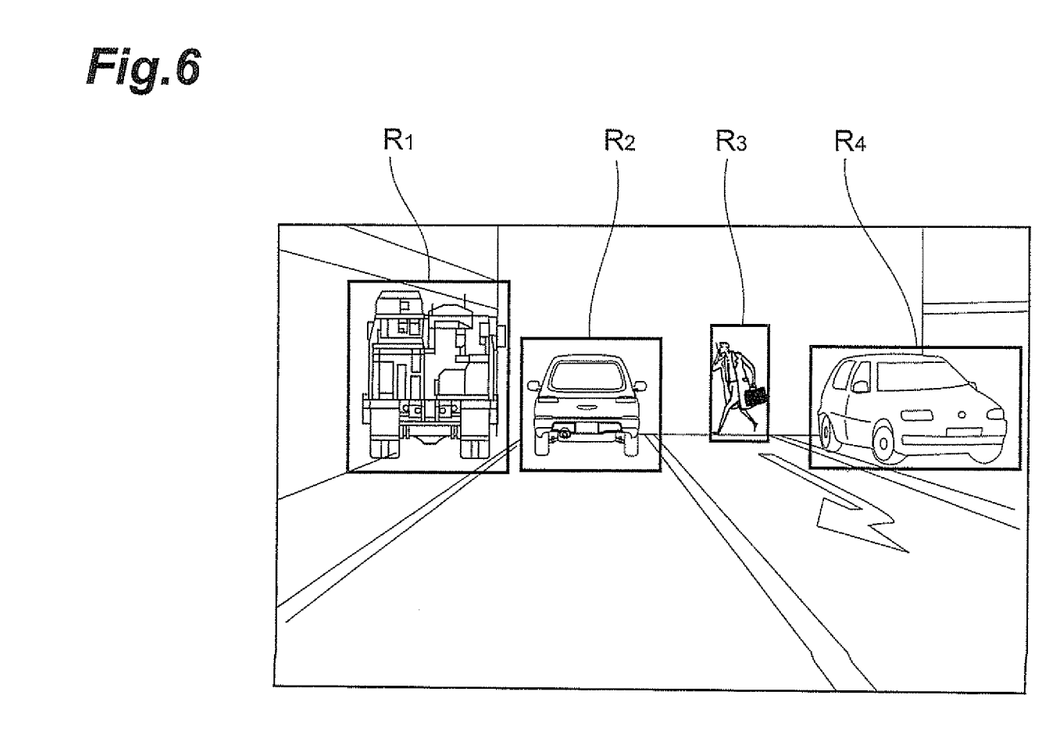
[FIG. 6] is a diagram illustrating a display example of a HMI display when the driving assistance information is provided for the driving assistance.

The information provision control unit 14 is highlighted an image of the object of the risk subject on the display of the HMI 5. FIG. 6 is a diagram illustrating an example of display of the HMI 5 when "provision of information" for the driving assistance is performed. In FIG. 6, as the object, the parked vehicle $R_1$, a preceding vehicle $R_2$, a pedestrian $R_3$, an emulative vehicle $R_4$, a certain color frame are superimposed and displayed on the display of the HMI 5. Further, as the driving assistance, in a case where the "reminder" is performed, the information provision control unit 14 can display the object while superimposing a color frame different from that of the "provision of information" in the display of the HMI 5.

The avoidance guidance control unit 15 drives a steering wheel, a brake pedal and an accelerator pedal in a direction that the vehicle C avoids the object by controlling various actuator 6 when the "avoidance guidance" as a driving assistance is performed. Further, the avoidance guidance control unit 15 creates a risk map for obtaining a target travelling path for guidance of the vehicle C. Herein below, the risk map will be described in brief.

Figure 7:
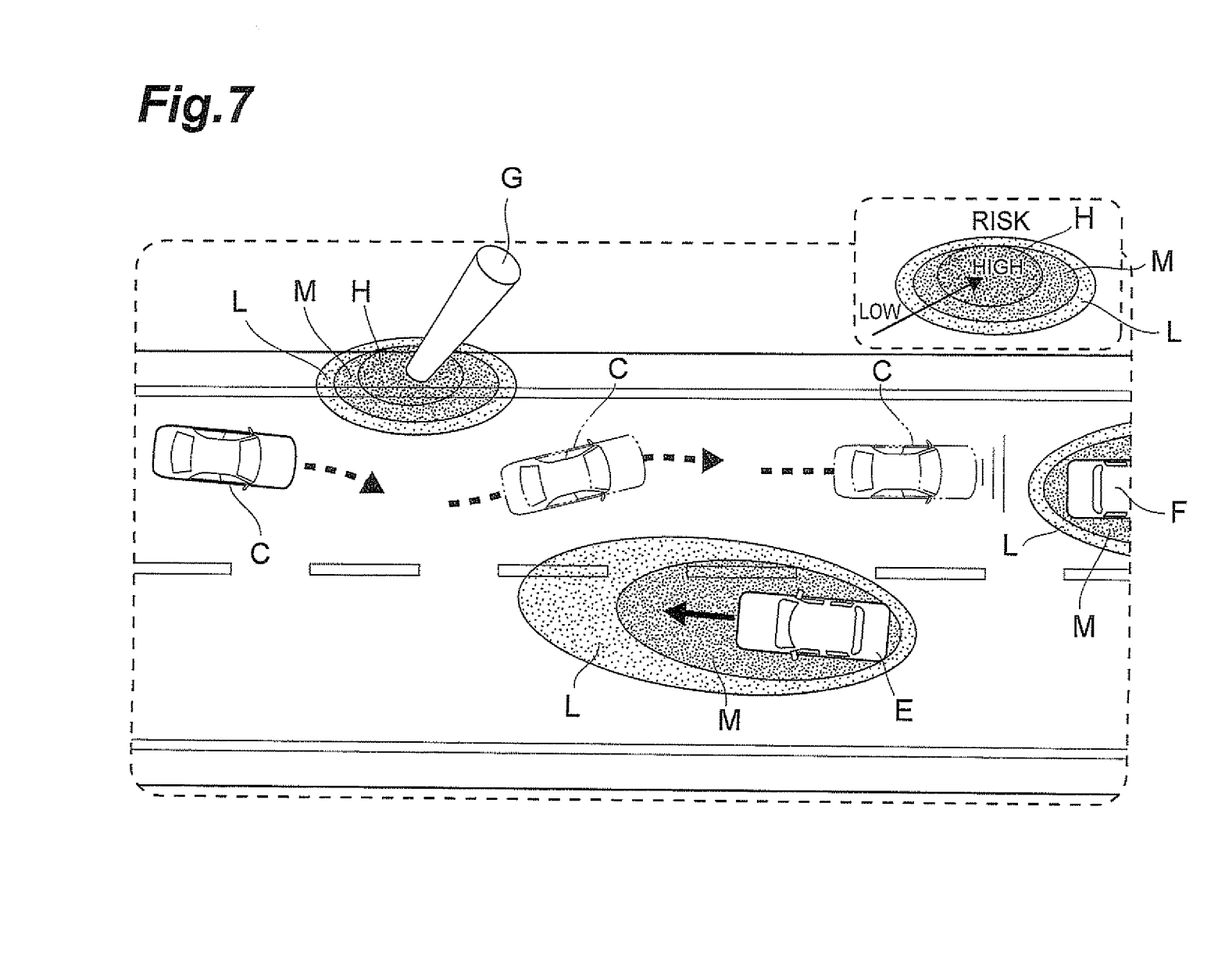
[FIG. 7] is a diagram illustrating an example of a risk map and a target travelling path based on the risk map.

FIG. 7 is a diagram illustrating an example of the risk map and the target travelling path based on the risk map. The avoidance guidance control unit 15 creates a risk map based on information related to the object sent out from the object detection unit 2, a traffic environment information sent out from the traffic environment information acquisition unit 3, the time to collision calculated by the collision prediction time calculation unit 10, information estimated risk level determined by the avoidance guidance control unit 11 and the like. As shown in FIG. 7, the risk map is a map for displaying areas where the collision risk became high for each object (electric pole G, facing vehicle E and preceding vehicle F) as an elliptical collision risk area, and for creating a recommended vehicle travelling path to avoid the collision risk areas. The collision risk area is set in response to the TTC for each obstacle and the risk level calculated from the estimated risk level. The risk level is an index indicating the collision risk and the lower the TTC, in other words, the shorter the time until the vehicle collides with the obstacle, the higher the value of the risk level. Further, the higher the risk level indicating the estimated risk level, the higher the risk level.

As shown in FIG. 7, the collision risk area is constituted with a plurality of grades in response to the risk level. For example, the collision risk area for the electric pole G is constituted by 3 grades of a low risk area, a medium risk area and a high risk area. The avoidance guidance control unit 15 creates target travelling path information and an optimum vehicle speed information when travelling the target travelling path. The avoidance guidance control unit 15 uses the created target travelling path information and the optimum vehicle speed information in the avoidance guidance.

The avoidance control unit 16 forcibly reduces the speed of or changes the travelling path of the vehicle by controlling the various actuators 6 when the "avoidance control" is performed as the driving assistance. Further, the alarm control unit 17 outputs a warning sound from a speaker of the HMI 5 when the "reminder" and "warning generation" are performed as the driving assistance perform.

The HMI 5 is an interface for taking information between device and driver, and includes display and speaker. The HMI 5 outputs an image display, a sound and a warning sound based on the control by the driving assistance control unit 13.

The various actuators 6 drive steering, brake pedal and accelerator pedal based on the control by the driving assistance control unit 13.

Figure 8:
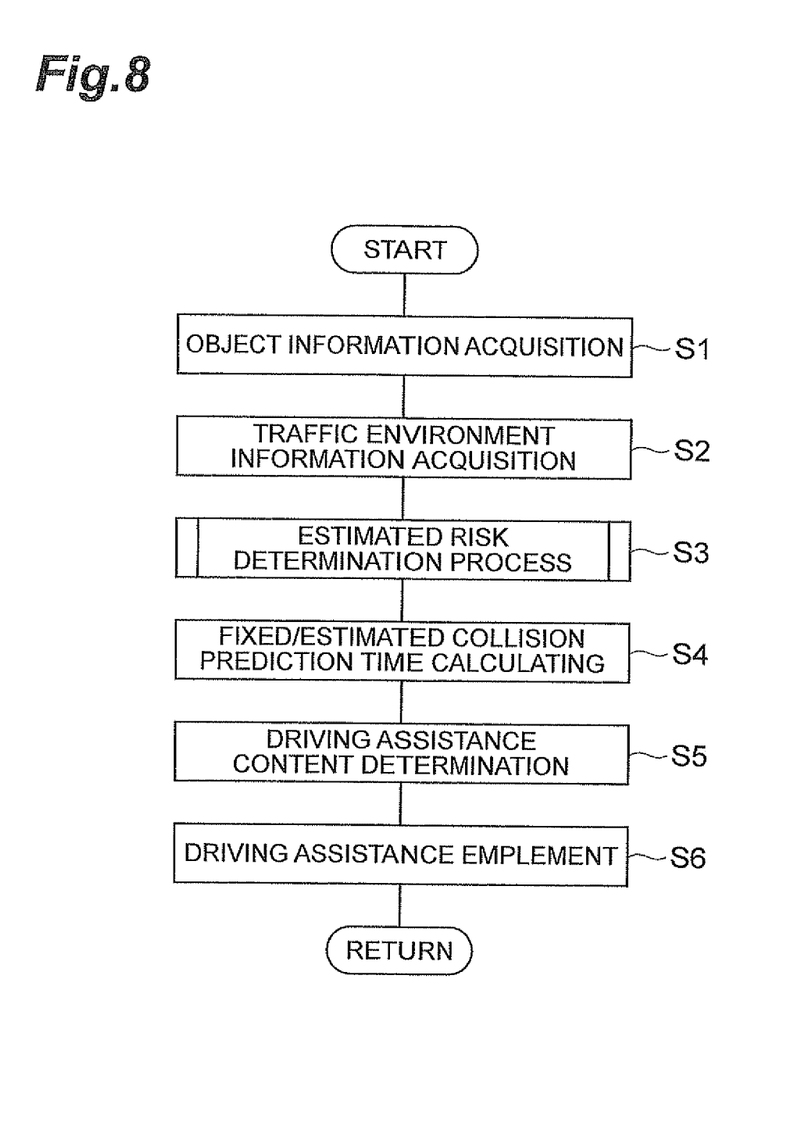
[FIG. 8] is a flowchart illustrating contents of the driving assistance process in the driving assistance device.

Next, referring to FIG. 8, the description of process performing in the driving assistance device 1 will be explained. FIG. 8 is a flowchart indicating the description of driving assistance process in the driving assistance device 1.

First, in STEP S1, the object detection unit 2 detects the object of the risk subject in driving the vehicle and sends the information related to the detected information with regard to the object to the control ECU 4. In succession, in STEP S2, the traffic environment information acquisition unit 3 acquires the traffic environment information and sends the detected traffic environment information to the control ECU 4.

Next, in STEP S3, the estimated risk level determination unit 11 determines the estimated risk level. The description of the estimated risk level determination process is as described referring to the flowchart of FIG. 3. The estimated risk level determination unit 11 sends out the determined estimated risk level to the driving assistance content determination unit 12.

In STEP S4, the collision prediction time calculation unit 10 calculates the time to collision in a case where the object presents on the predicted travelling path of the vehicle, and calculates the estimated collision prediction time in a case where the object presents at a location other than the predicted travelling path of the vehicle. Accordingly, the TTC calculation unit 10 sends out the calculated fixed/potential TTC to the driving assistance content determination unit 12.

In STEP S5, the driving assistance content determination unit 12 determines the driving assistance content based on the calculated, fixed and estimated collision times. Accordingly, in STEP S6, the driving assistance control unit 13 performs the driving assistance by controlling the HMI 5 and the various actuators 6 based on information related to the driving assistance content acquired from the driving assistance content determination unit 12. The processes of STEP S1 to STEP S6 described in above are performed for each object of the risk subject.

In the driving assistance device 1 according to the embodiment of the present invention as described above, when determining the driving assistance content based on the collision prediction time, there is considered the estimated risk level indicating the possibility of the object moving onto the predicted travelling path of the vehicle. According to this, even in a case where a risk is not being manifested as in a case where the object is not present on the predicted travelling path of the vehicle C, the potential risk related to the object is considered in determining the driving assistance content. Accordingly, it is possible to provide the driving assistance considering the potential risk.

Further, the above mentioned embodiment is to describe an example of the driving assistance device related to the present invention and the driving assistance device related to the present invention is not limited to that described in the embodiment. The driving assistance device 1 related to the present invention may be modified such that the gist of each claim 1s not changed or be adapted to other applications.

Industrial Applicability

According to the present invention, it is possible to perform driving assistance considering the potential risk.

REFERENCE SIGNS LIST

1 . . . driving assistance device
2 . . . object detection unit
3 . . . traffic environment information acquisition unit
4 . . . control ECU
6 . . . various actuators
10 . . . collision prediction time calculation unit
11 . . . estimated risk level determination unit
12 . . . driving assistance content determination unit
12T . . . driving assistance content determination table
13 . . . driving assistance control unit
14 . . . information provision control unit
15 . . . avoidance guidance control unit
16 . . . avoidance control unit
17 . . . alarm control unit

The invention claimed is:

1. A driving assistance device that performs a driving assistance for a driver of a vehicle to avoid an object of a risk subject when driving the vehicle, the device comprising:
    an object detection unit configured to detect the object;
    a collision prediction time calculation unit configured to calculate a collision prediction time that is a time indicating a degree to which the vehicle approaches to the object;
    an estimated risk level determination unit configured to determine an estimated risk level indicating a possibility of the object moving onto a predicted travelling path of the vehicle; and
    a driving assistance content determination unit configured to determine driving assistance content based on the collision prediction time and the estimated risk level,
    wherein the collision prediction time calculation unit calculates a fixed collision prediction time which is the collision prediction time with the object presenting on the predicted travelling path of the vehicle in a case where the object presents on the predicted travelling path of the vehicle, and calculates an estimated collision prediction time which is the collision prediction time with the object in a case where it is assumed that the object presenting at location other than the predicted travelling path of the vehicle moves onto the predicted travelling path of the vehicle,
    wherein the estimated risk level determination unit determines the estimated risk level on the basis of cause-and-effect relationship information which is information based on a relationship between an object and another object related to at least one of attribute, position and speed, as information indicating cause-and-effect relationship between the object and another object different from the object.

2. The driving assistance device according to claim 1, further comprising:
    a traffic environment information acquisition unit configured to acquire the traffic environment information that is information related to the traffic environment in the vicinity of the vehicle and the object,
    wherein the estimated risk level determination unit determines the estimated risk level as higher in a case when acquiring the traffic environment information indicating a possibility of the object moving onto the predicted travelling path of the vehicle, compared with a case when not acquiring the traffic environment information.

3. The driving assistance device according to claim 1,
    wherein the estimated risk level determination unit determines the estimated risk level as higher in a case when acquiring information indicating that the object moves onto the predicted travelling path of the vehicle, compared with a case when not acquiring the information.

* * * * *